(12) United States Patent
Yasuda et al.

(10) Patent No.: US 7,484,752 B2
(45) Date of Patent: Feb. 3, 2009

(54) AIRBAG APPARATUS FOR AUTOMOBILE

(75) Inventors: Mitsuo Yasuda, Nanto (JP); Ryoichi Katagishi, Nanto (JP); Yusuke Ishikuro, Nanto (JP); Hiroshi Yokouchi, Nanto (JP)

(73) Assignee: Sanko Gosei Kabushiki Kaisha, Nanto-shi (JP)

( * ) Notice: Subject to any disclaimer, the term of this patent is extended or adjusted under 35 U.S.C. 154(b) by 340 days.

(21) Appl. No.: 11/363,349

(22) Filed: Feb. 27, 2006

(65) Prior Publication Data

US 2007/0108741 A1 May 17, 2007

(30) Foreign Application Priority Data

Nov. 17, 2005 (JP) .............................. 2005-332953

(51) Int. Cl.
*B60R 21/20* (2006.01)
(52) U.S. Cl. .................................. 280/728.3
(58) Field of Classification Search ............... 280/728.1, 280/728.3, 732
See application file for complete search history.

(56) References Cited

U.S. PATENT DOCUMENTS

| | | | |
|---|---|---|---|
| 6,601,870 B2 * | 8/2003 | Suzuki et al. ............ | 280/728.3 |
| 6,761,375 B2 | 7/2004 | Kurachi et al. | |
| 6,929,280 B2 | 8/2005 | Yasuda et al. | |
| 7,007,970 B2 | 3/2006 | Yasuda et al. | |
| 7,178,825 B2 * | 2/2007 | Fujii et al. ............... | 280/728.3 |
| 7,234,726 B2 * | 6/2007 | Trevino et al. ........... | 280/728.3 |
| 2004/0026902 A1 * | 2/2004 | Yasuda et al. ............ | 280/728.2 |
| 2004/0056455 A1 | 3/2004 | Nishijima et al. | |
| 2006/0033313 A1 * | 2/2006 | Horiyama ................ | 280/728.3 |

FOREIGN PATENT DOCUMENTS

JP 3043604 3/2000

OTHER PUBLICATIONS

Yasuda, Mitsuo, et al., International Publication No. WO 99/01317, published Jan. 14, 1999.

* cited by examiner

*Primary Examiner*—John Q. Nguyen
*Assistant Examiner*—Robert A. Coker
(74) *Attorney, Agent, or Firm*—W. Norman Roth

(57) ABSTRACT

A vehicle airbag apparatus in which a frame and reinforcement members can be vibration-welded to an instrument panel with uniform strength and without distortion or discoloration of the instrument panel cover caused by the vibration welding. First weld ribs on a frame and second weld ribs on reinforcement members joined to the frame have a length which extends in the direction of vibration welding. The lengths of the first weld ribs and the second weld ribs extending in the vibration direction are set to be three times or more as long as an amplitude of the vibration welding. Passages for flowing a cooling fluid along the first weld ribs are provided on the joining surfaces of the joint flange, and furthermore, passages for flowing the cooling fluid along the second weld ribs may be provided on the joining surfaces of the reinforcements.

8 Claims, 13 Drawing Sheets

US 7,484,752 B2

AIRBAG APPARATUS FOR AUTOMOBILE

BACKGROUND OF THE INVENTION

1. Field of the Invention

The present invention relates to an airbag apparatus for an automobile for securing safety of a passenger in an automobile such as a car when it collides, and in particular, to improvement in a vibration welding structure suitable to joining an instrument panel forming an airbag cover and reinforcement members for reinforcing an inflation unfolding section of the instrument panel and an airbag supporting frame to each other by means of vibration welding.

2. Description of the Related Art

An airbag apparatus for an automobile is available as a tool for securing safety of a passenger in a front passenger seat or a driver seat in an automobile such as a car by protecting the passenger from impact of collision when the automobile collides on its front or side.

Such a type of airbag apparatus for an automobile comprises an airbag, an airbag case to accommodate the airbag in a folded state so that the airbag can easily inflates and unfold, and an inflator that inflates the folded airbag in a short period of time. Particularly, an airbag apparatus to be used for a front passenger seat is provided inside the instrument panel, and when the speed of the automobile is suddenly reduced due to collision, the airbag apparatus operates the inflator and promptly inflates the airbag by a high-pressure gas from this inflator, whereby splitting and opening the instrument panel along a fragile splitting contour, and simultaneously, unfolding and inflating the airbag from this opening to the outside of the instrument panel to protect the passenger from an impact of collision by a cushioning action of the airbag.

Inside the instrument panel to which such an airbag apparatus for an automobile is attached, in particular, to the back surface of the instrument panel in which a fracture-opening section is formed, reinforcement members and an airbag supporting frame made of a thermoplastic resin material such as TPO (thermoplastic polyolefin) are integrally welded, whereby the fracture-opening section is prevented from being deformed into a concave shape or fractured by an impact force applied from the outside of the instrument panel, and the fracture-opening section is prevented from scattering upon separating from the instrument panel when the fracture-opening section is opened due to inflating and unfolding of the airbag. For welding such an instrument panel and the reinforcement members and the frame together, a vibration welder is used (for example, refer to U.S. Pat. No. 3,043,604).

Next, a conventional airbag apparatus for an automobile is explained with reference to FIG. 1 through FIG. 4.

FIG. 1 is a vertical sectional side view of a main portion of a conventional airbag apparatus for an automobile, FIG. 2 is a plan view taken from the arrow 2A direction in FIG. 1, FIG. 3 is a plan view of a frame and reinforcement members in the conventional airbag apparatus for an automobile, and FIG. 4 is an explanatory enlarged sectional view showing welding between an instrument panel and a frame and reinforcement members in the conventional apparatus.

As shown in FIG. 1, the airbag apparatus 1 for an automobile of the present invention comprises an instrument panel 2, an airbag 3, and airbag case 4, a frame 5, a pair of reinforcement members 6, an inflator (not shown), and so on.

The instrument panel 2 is attached to the front of a driver seat and a front passenger seat in, for example, a car, and is molded from a hard polypropylene (PP) with a thickness of 3 mm to 4 mm. On the outer surface of the instrument panel 2, a decorative surface layer (not shown) is laminated as appropriate.

On the back surface of the instrument panel 2, as shown in FIG. 1 and FIG. 2, a fragile splitting contour 7 is formed into a rectangular shape long in the horizontal direction, and on the inner side of this fragile splitting contour 7, a center splitting line 7a that divides the section surrounded by the fragile splitting contour 7 into two in the shorter length direction extends in the longer length direction. The fragile splitting contour 7 and the center splitting line 7a are for splitting and opening the section surrounded by the fragile splitting contour 7 in a biparting manner to inflate and unfold the airbag 3 to the outside of the instrument panel 2.

The fragile splitting contour 7 and the center splitting line 7a are formed by processing dot-like slit pores (blind foramen) with a depth that does not penetrate the instrument panel 2 by irradiating a laser beam of an infrared ray with a beam diameter of 0.2 to 0.5 mm and a wavelength of 10.6 μm from the back surface side of the instrument panel 2.

To the back surface of the instrument panel 2, as shown in FIG. 1, a rectangular cylindrical frame 5 molded from TPO so as to surround the rectangular fragile splitting contour 7 is vibration-welded along the fragile splitting contour 7 via an joint flange 5a provided on the frame. Inside the frame 5, attached are a pair of reinforcement members 6 made of TPO for reinforcing the section surrounded by the fragile splitting contour 7 from the back surface of the instrument panel 2.

Each reinforcement member 6 includes, as shown in FIG. 1, a support 6a for coupling the reinforcement member 6 by a dovetail groove method or the like to the inner surface of the frame 5, and a reinforcement 6c that is joined in a bendable manner to the upper end of the support 6a via a hinge 6b and vibration-welded to the back surface of the section surrounded by the fragile splitting contour 7.

The airbag 3 is accommodated in a folded state as shown in FIG. 1 in the airbag case 4 made of a metal plate member. On the side surfaces corresponding to the upper end opening 4a of the airbag case 4, a plurality of hooks 9 are provided so as to project outward. Each hook 9 engages in a hole 6e provided in the support 6a of the reinforcement member 6 and a hole 5d provided in the frame 5 corresponding to the hole 6e, whereby fixing the airbag case 4 to the frame 5.

At the lower end of the airbag case 4, an inflator accommodation section 10 for accommodating an inflator (not shown) for supplying an inflating gas into the airbag 4 is provided. The airbag case 4 is fixed to a fixing member such as a cross member 12 by a bolt and nut 13 via a supporting member 11.

Next, the welding structure of the instrument panel 2 and the frame 5 and the reinforcement members 6 in the conventional airbag apparatus for an automobile is explained with reference to FIG. 1, FIG. 3, and FIG. 4.

As shown in FIG. 1 and FIG. 3, for example, a number of convex portions 5b with a height of approximately 2 mm and a diameter or a length of approximately 3 to 5 mm are formed in an embossing manner at predetermined intervals on the entire surface of the joint flange 5a in opposition to the back surface of the instrument panel 2, and furthermore, a number of convex portions 6d like the convex portions 5b of the joint flange 5a are formed in an embossing manner at predetermined intervals on the entire surface of the reinforcement 6c in opposition to the back surface of the instrument panel 2.

The pair of reinforcement members 6 thus configured are attached to the inside of the frame 5 as shown in FIG. 1 and FIG. 3, and then the frame 5 is set together with the reinforcement members 6 at a predetermined position of a vibration welder and the instrument panel 2 is set at a predetermined position of the vibration welder, the joint flange 5a of the frame 5 and the reinforcements 6c of the reinforcement members 6 are held while pressurized to the instrument panel 2 so that the convex portions 5b of the joint flange 5a and the convex portions 6d of the reinforcements 6c are pressed against the back surface of the instrument panel 2, and in this state the joint flange 5a and the reinforcements 6c and the instrument panel 2 are relatively vibrated at an amplitude of, for example, 1.5 mm to 3.0 mm in directions of rubbing together, and by frictional heat generated on the rubbing surface, the back surface of the instrument panel 2 and the convex portions 5b and the convex portions 6d are welded to each other. Thereby, the joint flange 5a of the frame 5 and the reinforcements 6c of the reinforcement members 6 can be joined to the back surface of the instrument panel 2.

However, in the welding structure of the frame 5 and the reinforcement members 6 and the instrument panel 2 in the conventional airbag apparatus for an automobile, a number of convex portions 5b formed in an embossing manner on the joint flange 5a of the frame 5 and a number of convex portions 6d formed in an embossing manner on the reinforcements 6c of the reinforcement members 6 are pressed against the back surface of the instrument panel 2 and vibration-welded, so that such prior art has the following problem.

Namely, while pressing the convex portions 5b and 6d against the back surface of the instrument panel 2, when the joint flange 5a including the frame 5 and the reinforcements 6c including the reinforcement members 6 are vibrated at an amplitude of, for example, 1.5 mm to 3.0 mm in the arrow A direction shown in FIG. 4 with respect to the instrument panel 2 and the convex portions 5b and 6d are vibration-welded to the back surface of the instrument panel 2, the melting temperature of the convex portions 5b and 6d made of TPO is lower than that of the instrument panel 2 made of PP, so that when the tip ends of the convex portions 5b and 6d start melting due to the frictional heat, non-welded portions 5b1 and 6d1 projecting as burrs while turned up outward as shown in FIG. 4 are formed at the positions of both ends in the vibration direction (arrow A direction) of the tip ends. These non-welded portions 5b1 and 6d1 have almost no welding performance to the back surface of the instrument panel 2, and rather become factors hindering the vibration welding of the convex portions 5b and 6d. Therefore, the substantial effective welding lengths L1 of the convex portions 5b and 6d to the back surface of the instrument panel 2 become equal to or less than the projecting lengths L2 of the non-welded portions 5b1 and 6d1 (L1<L2), and the substantial welding strength of the convex portions 5b and 6d to the instrument panel 2 lowers. Therefore, to improve the welding strength of the frame 5 and the reinforcement members 6 to the instrument panel 2, it is necessary to increase the forming density of the convex portions 5b on the joint flange 5a of the frame 5 and the forming density of the convex portions 6d on the reinforcements 6c of the reinforcement members 6.

However, if the forming densities of the convex portions 5b and the convex portions 6d are increased, the pressing force to be applied to the frame 5, the reinforcement members 6, and the instrument panel 2 must be increased, thus this increasing the size of the pressurizing mechanism of the vibration welder, and causing a nonuniform pressing force for the convex portions 5b and 6d against the back surface of the instrument panel as well, thereby lowering the welding strength of the frame 5 and the reinforcement members 6 to the instrument panel back surface, and causing the portions with low welding strength to easily separate, resulting in a failure of inflating and unfolding of the airbag.

In addition, the welding areas of the embossed convex portions 5b and 6d are narrow, so that the heating value caused by the vibrating friction between the back surface of the instrument panel 2 and the convex portions 5b and 6d becomes locally large, and as a result, this heat causes local thermal deformation and discoloration on the outer surface of the instrument panel 2, and these appear as welding scars on the outer surface of the instrument panel 2. Particularly, when a decorative surface layer is provided on the surface of the instrument panel 2 of an automobile, etc., welding scars caused by thermal deformation and discoloration on the surface layer deteriorate appearance of the product and lower the quality.

SUMMARY OF THE INVENTION

In order to solve the above-mentioned conventional problem, an object of the present invention is to provide an airbag apparatus for an automobile wherein a frame and reinforcement members can be vibration-welded to an instrument panel with a uniform strength across the entire joining surfaces and the product can be prevented from being thermally deformed or discolored by heat caused by the vibration-welding.

To achieve the object, according to one aspect of the present invention, there is provided an airbag apparatus for an automobile comprising: an instrument panel; an airbag; an airbag case in which the airbag is accommodated in a folded state; an inflator that supplies gas to the folded airbag to inflate and unfold the airbag; a resin-made frame that is fixed to the back surface of the instrument panel so as to surround a split opening section of the instrument panel to be split and opened according to the unfolding inflation of the airbag and supports the airbag case; and resin-made reinforcement members which are held by the frame and reinforce the split opening section from the back surface side, wherein the frame has an joint flange to be joined to the back surface of the instrument panel, and on the entire joining surfaces of the joint flange in opposition to the back surface of the instrument panel, a number of first weld ribs with a predetermined width to be vibration-welded to the back surface of the instrument panel so as to extend long in the vibration direction of the vibration welding, are projectedly provided at predetermined intervals perpendicularly to the vibration direction, and the reinforcement members have reinforcements to be joined to the back surface of the unfolding section, and on the entire joining surfaces of the reinforcements in opposition to the back surface of the instrument panel, a number of second weld ribs with a predetermined width to be vibration-welded to the back surface of the instrument panel so as to extend long in the vibration direction of the vibration welding are projectedly provided at predetermined intervals perpendicularly to the vibration direction.

According to another aspect of the present invention, there is provided the airbag apparatus for an automobile, wherein the first weld ribs projectedly provided on the joining surfaces of the joint flange of the frame are extended long in the vibration direction of vibration welding, the second weld ribs projectedly provided on the joining surfaces of the reinforcements of the reinforcement members are extended long in the vibration direction of vibration welding, and in particular, the lengths of the first weld ribs and the second weld ribs extending in the vibration direction are set to be three times or more as long as the amplitude of the vibration welding, so that sufficient effective welding lengths of the first weld ribs and the second weld ribs to the back surface of the instrument panel can be secured, thus allowing the frame and the reinforcement members to be vibration-welded to the instrument panel with uniform strength across the entire joining surfaces.

According to another aspect of the present invention, there is provided the airbag apparatus for an automobile, wherein, since the first weld ribs and the second weld ribs are structured so as to be longer in the vibration direction, so that heat generated by vibration friction between these and the back surface of the instrument panel is diffused, thereby preventing the first weld ribs and the second weld ribs from being locally over-heated, whereby preventing thermal deformation and discoloration of the product.

According to another aspect of the present invention, there is provided the airbag apparatus for an automobile, wherein vibration welding portions of the first weld ribs are cooled by flowing a cooling fluid via the cooling fluid supply and discharge ports through passages which are provided on the joint surface of the joint flange of the frame along the first weld ribs, and, furthermore, vibration welding portions of the second weld ribs are cooled by flowing a cooling fluid via the cooling fluid supply and discharge ports through passages which are provided on the joint surface of the joint flange of the frame along the second weld ribs, whereby reliably preventing thermal deformation and discoloration of the product.

According to another aspect of the present invention, there is provided the airbag apparatus for an automobile, wherein the first passage ribs forming the cooling fluid passages of the joint flange are formed with a width of 0.3 to 1.5 mm, and the second passage ribs forming the cooling fluid passages of the reinforcements formed with a width of 0.3 to 1.5 mm, so that these passage ribs do not adversely influence the vibration welding of the first weld ribs and the second weld ribs, thus allowing the cooling fluid passages to be reliably formed.

According to another aspect of the present invention, there is provided the airbag apparatus for an automobile, wherein the first weld ribs to be formed at corners of the joining surfaces of the joint flange are formed by protrusions with curvatures corresponding to the corner shapes or protrusions inclined at an angle less than 90 degrees from the vibration direction, so that the vibration welding at the corners of the joint flange to the back surface of the instrument panel can be secured with a reliable welding strength.

According to another aspect of the present invention, there is provided the airbag apparatus for an automobile, wherein a rib is formed on the outer circumferential edge of the joint flange, thereby preventing the resin material of the first weld ribs and the back surface of the instrument panel from melting out when they are vibration-welded.

BRIEF DESCRIPTION OF THE DRAWINGS

Further features of the invention, its nature and various advantages will be more apparent from the accompanying drawings and the following detailed description of the preferred embodiments, in which.

DESCRIPTION OF THE PREFERRED EMBODIMENTS

First Embodiment

Figure 1:
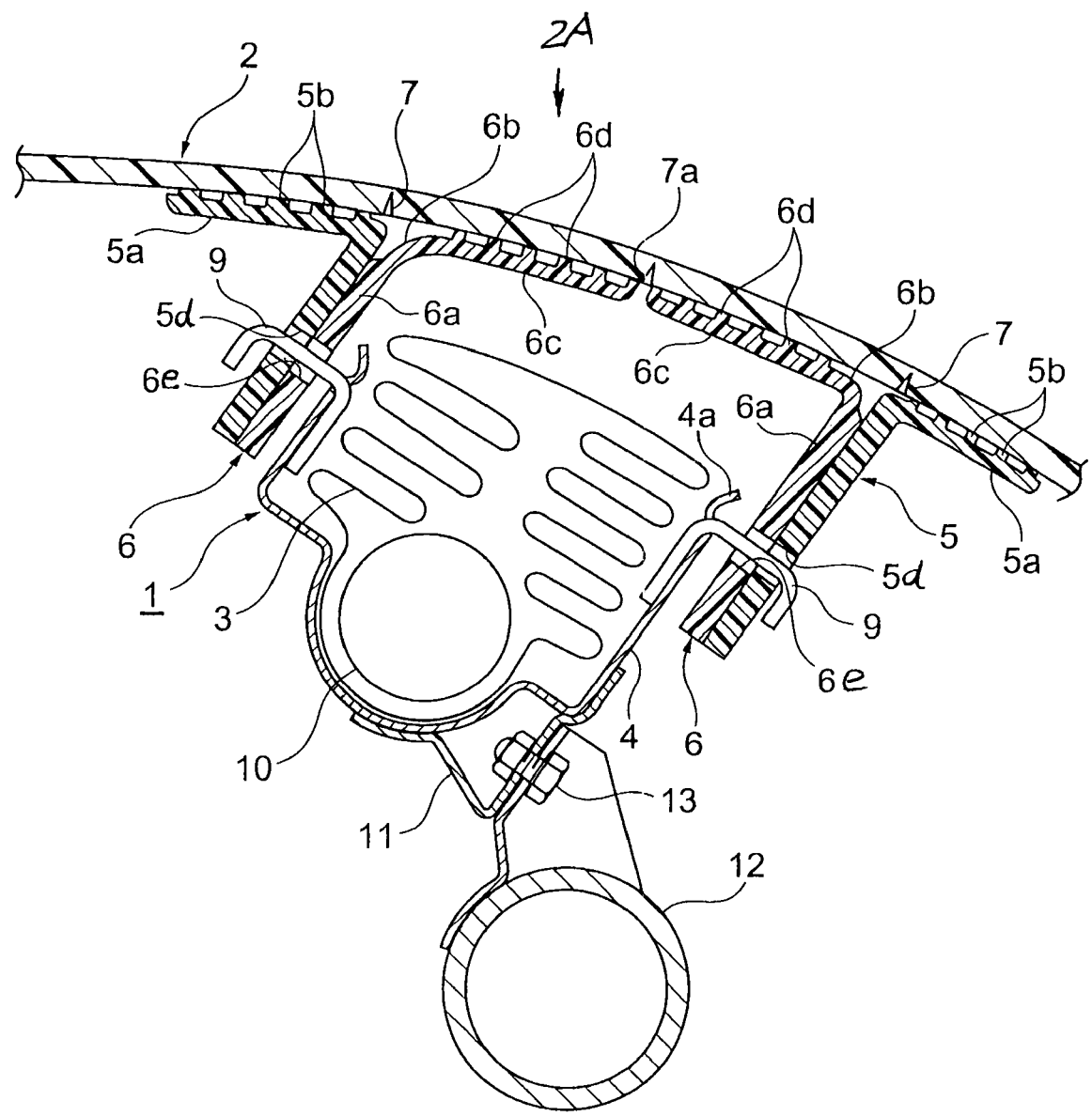
FIG. 1 is a vertical sectional side view of a main portion of a conventional airbag apparatus for an automobile.
Figure 2:
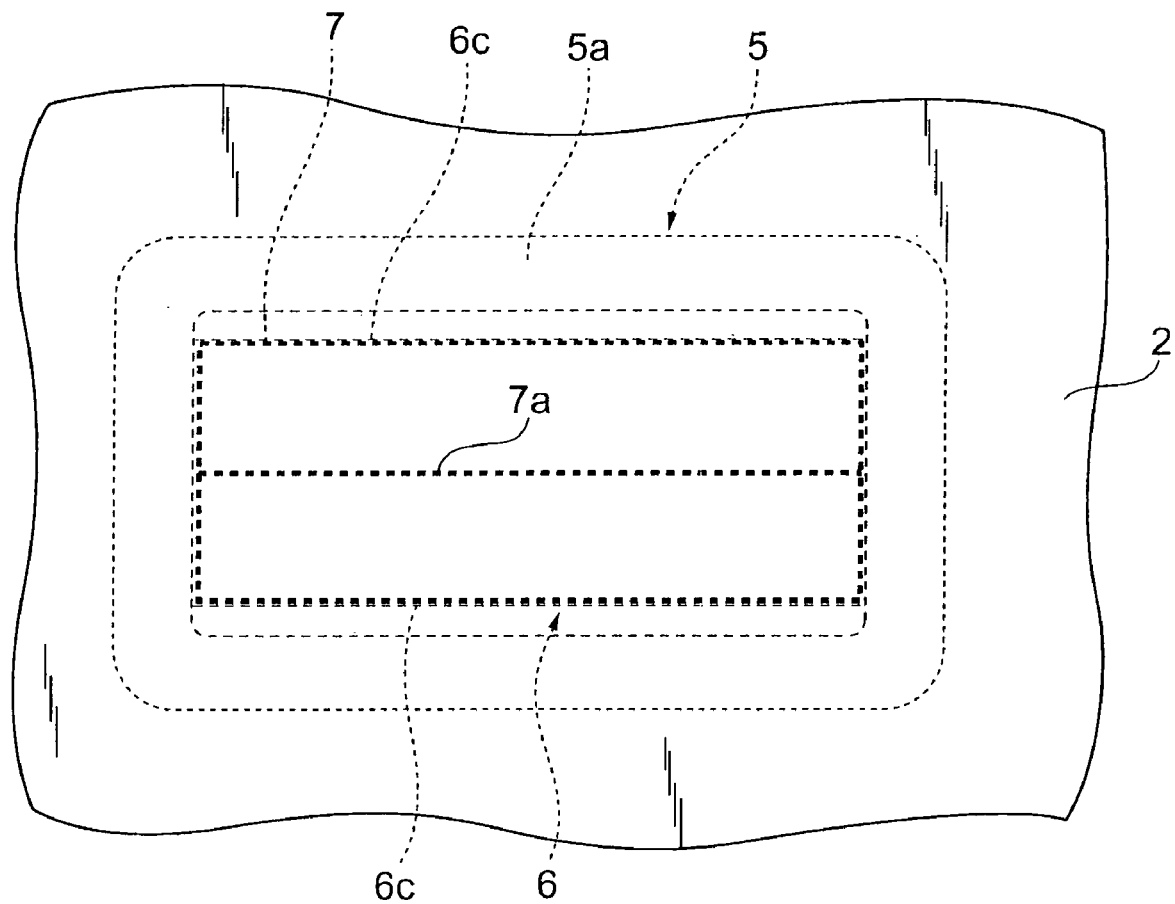
FIG. 2 is a plan view of the main portion of FIG. 1 from the arrow 2 direction.
Figure 3:
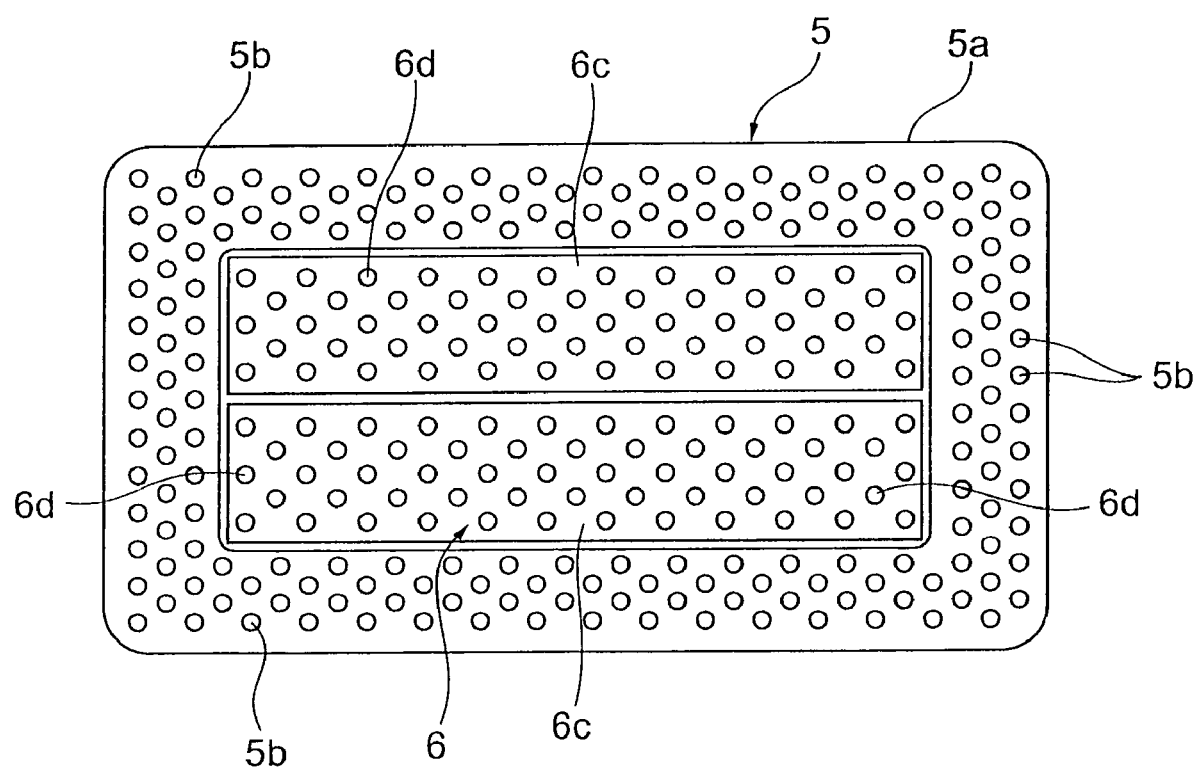
FIG. 3 is a plan view of a frame and reinforcement members in the conventional airbag apparatus for an automobile.
Figure 4:
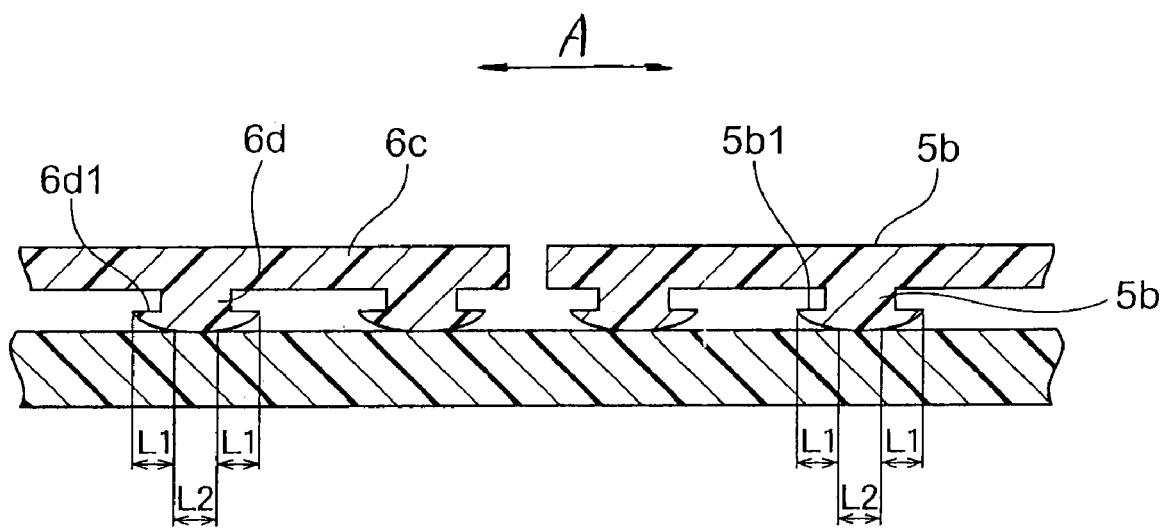
FIG. 4 is an explanatory enlarged sectional view of welding between an instrument panel and the frame and the reinforcement members in the conventional apparatus.
Figure 5:
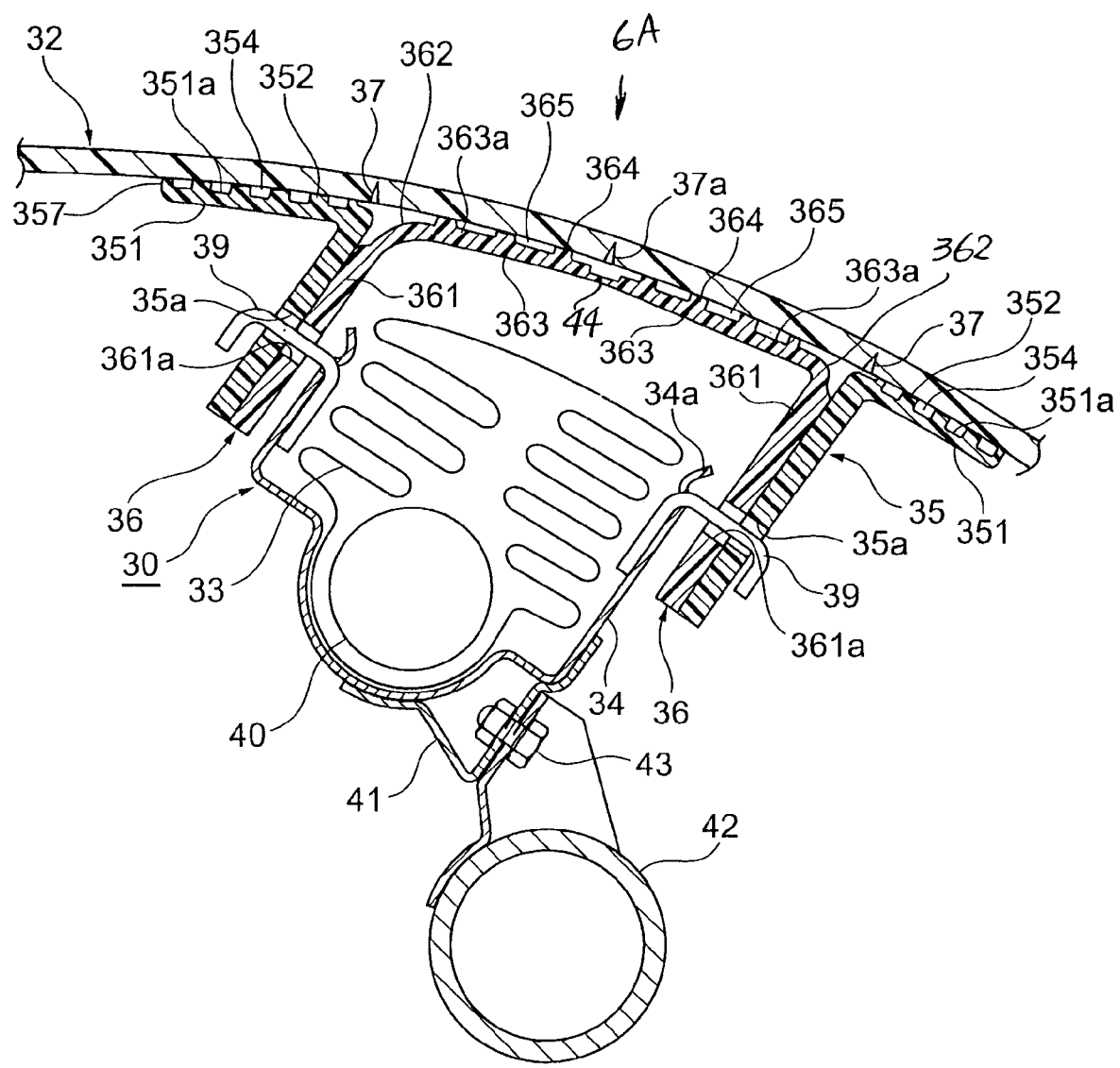
FIG. 5 is a vertical sectional side view of a main portion of an airbag apparatus for an automobile according to a first embodiment of the invention.

In FIG. 5, the airbag apparatus 30 for an automobile comprises an instrument panel 32, an airbag 33, an airbag case 34, a frame 35, a pair of reinforcement members 36, an unillustrated inflator, and so on.

The instrument panel 32 is attached to the front of a driver seat and a front passenger seat of, for example, an automobile, and is molded from hard polypropylene (PP) with a thickness of 3 mm to 4 mm. On the outer surface of the instrument panel 32, a decorative surface layer (not shown) is laminated as appropriate.

Figure 6:
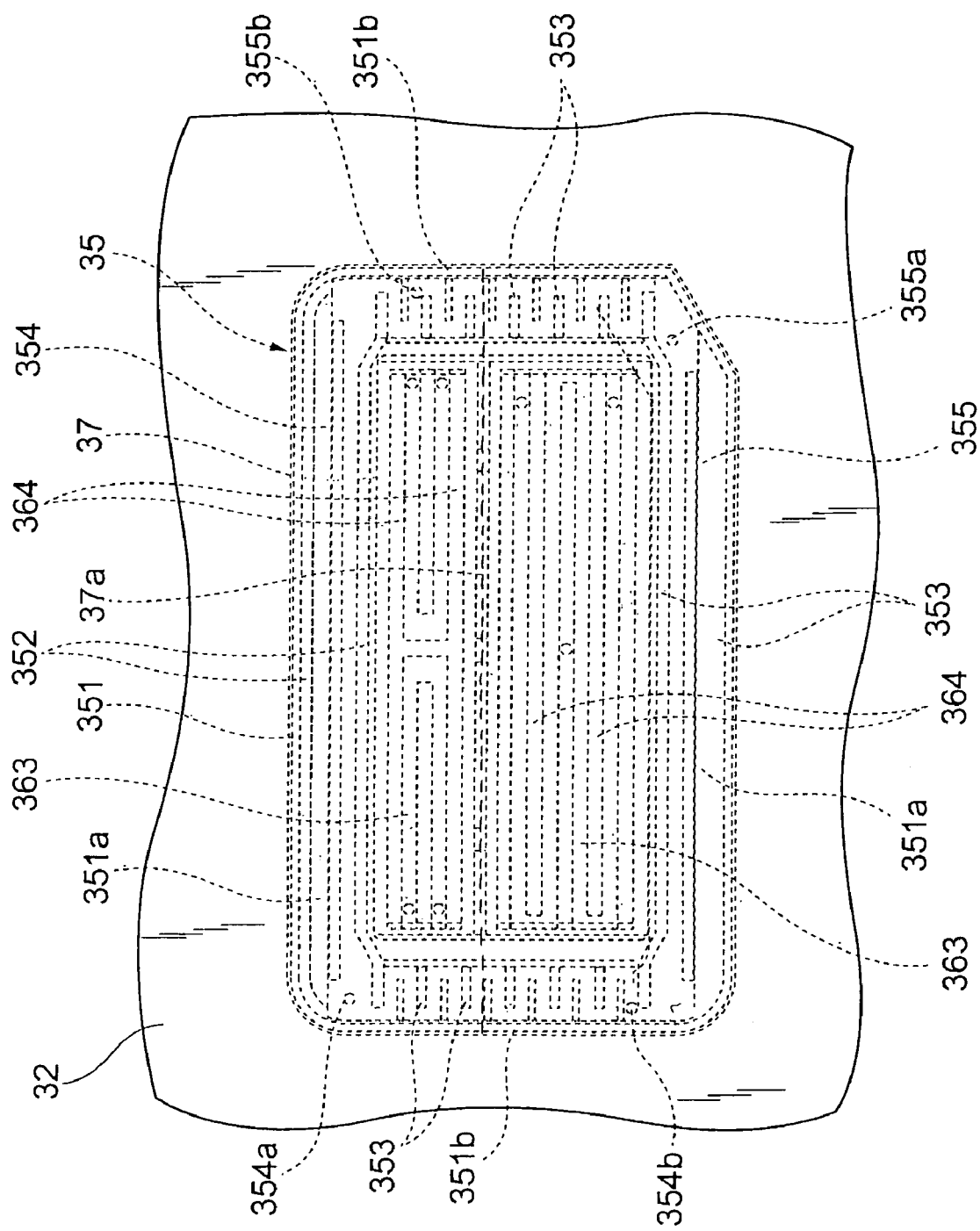
FIG. 6 is a plan view of the main portion of FIG. 5 from the arrow 6 direction.

To the back surface of the instrument panel 32, as shown in FIG. 5 and FIG. 6, a fragile splitting contour 37 is formed in a rectangular shape long in the horizontal direction, and at the inner side of this fragile splitting contour 37, a center splitting line 37a that divides the section surrounded by the fragile splitting contour 37 into two in the shorter length direction is extended in the longer length direction. The fragile splitting contour 37 and the center splitting line 37a are for splitting and opening the section surrounded by the fragile splitting contour 37 in a biparting manner when the airbag 33 is inflated and unfolded and unfolding the airbag 33 to the outside of the instrument panel 32.

These fragile splitting contour 37 and center splitting line 37a are formed by processing dot-like slit pores (blind foramen) with a depth that does not penetrate the instrument panel 32 by irradiating a laser beam of an infrared ray with a beam diameter of 0.2 to 0.5 mm and a wavelength of 10.6 μm from the back surface side of the instrument panel 32.

To the back surface of the instrument panel 32, as shown in FIG. 5, a rectangular cylindrical (square cylindrical) frame 35 molded from TPO so as to surround the rectangular fragile splitting contour 37 is vibration-welded along the rectangular fragile splitting contour 37 via an joint flange 351 provided at one end of the frame. To the inside of the frame 35, a pair of reinforcement members 36 made of TPO for reinforcing the section surrounded by the fragile splitting contour 37 from the back surface of the instrument panel 32 are attached.

Each reinforcement member 36 comprises a support 361 for coupling the reinforcement member 36 to the inner surface of the frame 35 by a dovetail groove method or the like, and a reinforcement 363 that is joined to the upper end of the support 361 in a bendable manner via a hinge 362 and vibration-welded to the back surface of the section surrounded by the fragile splitting contour 37. The tip ends of the reinforcements 363 of the reinforcement members 36 are joined to each other by joints 44 at a plurality of points. The joints 44 are fractured simultaneously when the section surrounded by the fragile splitting contour 37 splits and opens according to unfolding inflation of the airbag 33, and have a partial slit.

The airbag 33 is accommodated in the airbag 34 made of a metal plate member in the folded state as shown in FIG. 5. At the side surfaces corresponding to the upper end opening 34a of the airbag case 34, a plurality of hooks 39 are provided so as to project outward. Each hook 39 engages in a hole 361a provided in the support 361 of the reinforcement member 36 and a hole 35a provided in the frame 35 corresponding to the hole 361a, whereby fixing the airbag case 34 to the frame 35.

At the lower end of the airbag case 34, an inflator accommodation section 40 to accommodate an inflator (not shown) for supplying an inflating gas into the airbag 33 is provided as shown in FIG. 5. The airbag case 34 is fixed to a fixing member such as a cross member 42 by a bolt and nut 43 via a supporting member 41.

Next, a welding structure between the instrument panel 32 and the frame 35 and the reinforcement members 36 of the airbag apparatus for an automobile of the embodiment is explained with reference to FIG. 5 through FIG. 7.

Figure 7:
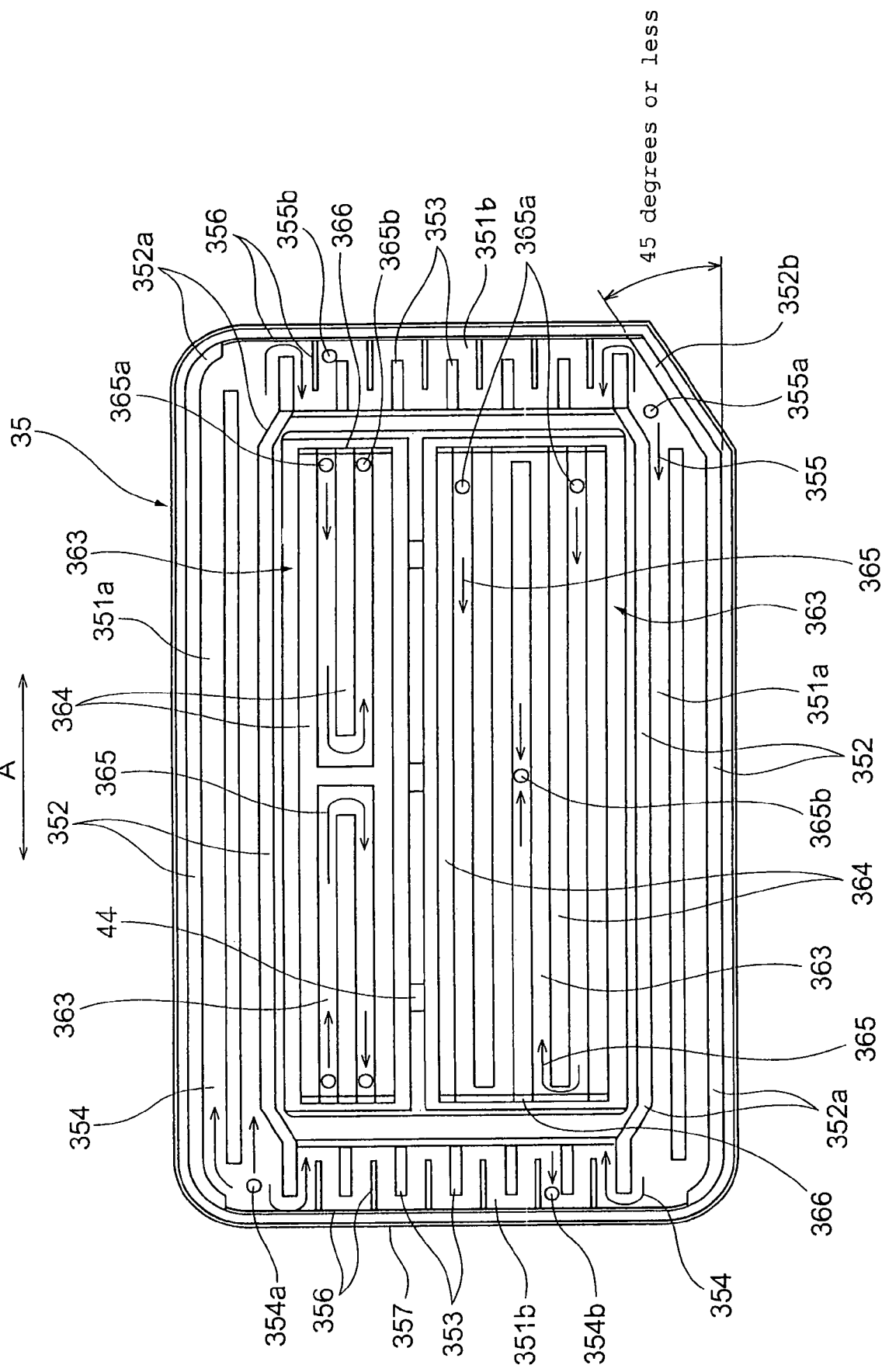
FIG. 7 is a plan view of a frame and reinforcement members in the airbag apparatus for an automobile of the first embodiment.

The joint flange 351 of the frame 35 assumes a rectangular shape corresponding to the shape of the frame 35 as shown in FIG. 6, and on the joining surfaces 351a of this joint flange 351 on the longer length sides in opposition to the back surface of the instrument panel 32, as shown in FIG. 5 and FIG. 7, a plurality of first weld ribs 352 with a predetermined width (for example, 3 to 5 mm) that are in parallel to the vibration direction of the vibration welding shown by the arrow A, extend across almost the entire length in the longer length direction of the joint flange 351, and are vibration-welded to the back surface of the instrument panel 32, are projectedly provided at predetermined intervals (for example, 3 to 5 mm) perpendicularly to the vibration direction A, and furthermore, on the joining surfaces 351b of the joint flange 351 on the shorter length sides in opposition to the back surface of the instrument panel 32, as shown in FIG. 5 and FIG. 7, a number of weld ribs 353 with a predetermined width (for example, 3 to 5 mm) that are in parallel to the vibration direction of the vibration welding shown by the arrow A, extend in the longer length direction of the joint flange 351, and are vibration-welded to the back surface of the instrument panel 32 are projectedly provided at predetermined intervals (for example, 3 to 5 mm) perpendicularly to the vibration direction A.

On the joining surfaces 351a and 351b of the joint flange 351, as shown in FIG. 5 and FIG. 7, passages 354 and 355 for flowing a cooling fluid along the first weld ribs 352 and 353 vibration-welded to the back surface of the instrument panel 32 are provided, and furthermore, in these passages 354 and 355, cooling fluid supply ports 354a and 355a and discharge ports 354b and 355b are provided, respectively.

The passages 354 for the cooling fluid along the first weld ribs 352 and the passages 355 for the cooling fluid along the first weld ribs 353 are defined by spaces surrounded by the first weld ribs 352 and 353, the back surface of the instrument panel 32, and the first passage ribs 356 with a width of 0.3 to 1.5 mm (a width of approximately 1 mm that is ½ or less of the projecting height) formed on the joining surfaces 351a and 351b of the joint flange 351.

The first weld ribs 352 formed at the points corresponding to the corners between the joining surfaces 351a and 351b of the joint flange 351 are formed by protrusions 352a with curvatures corresponding to the corner shapes or protrusions 352b inclined at an angle less than 90 degrees (preferably, at 45 degrees or less) from the vibration direction as shown in FIG. 7.

On the outer circumferential edge of the joint flange 351, as shown in FIG. 7, a rib 357 is formed on the outer circumferential edge of the joint flange, thereby preventing the resin material of the first weld ribs 352, 353 and the back surface of the instrument panel 32 from melting out when they are vibration-welded.

On the joining surfaces 363a of the reinforcements 363 in the respective reinforcement members 36 in opposition to the back surface of the instrument panel 32, as shown in FIG. 5 and FIG. 7, second weld ribs 364 with a predetermined width (for example, 3 to 5 mm) that are in parallel to the vibration direction of the vibration welding shown by the arrow A, extend across almost the entire lengths in the longer length direction of the reinforcements 363, and are vibration-welded to the back surface of the instrument panel 32 are projectedly provided at predetermined intervals (for example, 3 mm to 5 mm) perpendicularly to the vibration direction A.

On the joining surfaces 363a of the reinforcements 363, as shown in FIG. 5 and FIG. 7, passages 365 for flowing a cooling fluid along the second weld ribs 364 vibration-welded to the back surface of the instrument panel 32 are provided, and in the passages 365, cooling fluid supply ports 365a and discharge ports 365b are provided, respectively.

The passages 365 for the cooling fluid along the second weld ribs 364 are formed by spaces surrounded by the second weld ribs 364, the back surface of the instrument panel 32, and second passage ribs 366 with a width of 0.3 to 1.5 mm (for example, approximately 1 mm that is ½ or less of the projecting height) formed on the joining surfaces 363a of the reinforcements 363.

Figure 8:
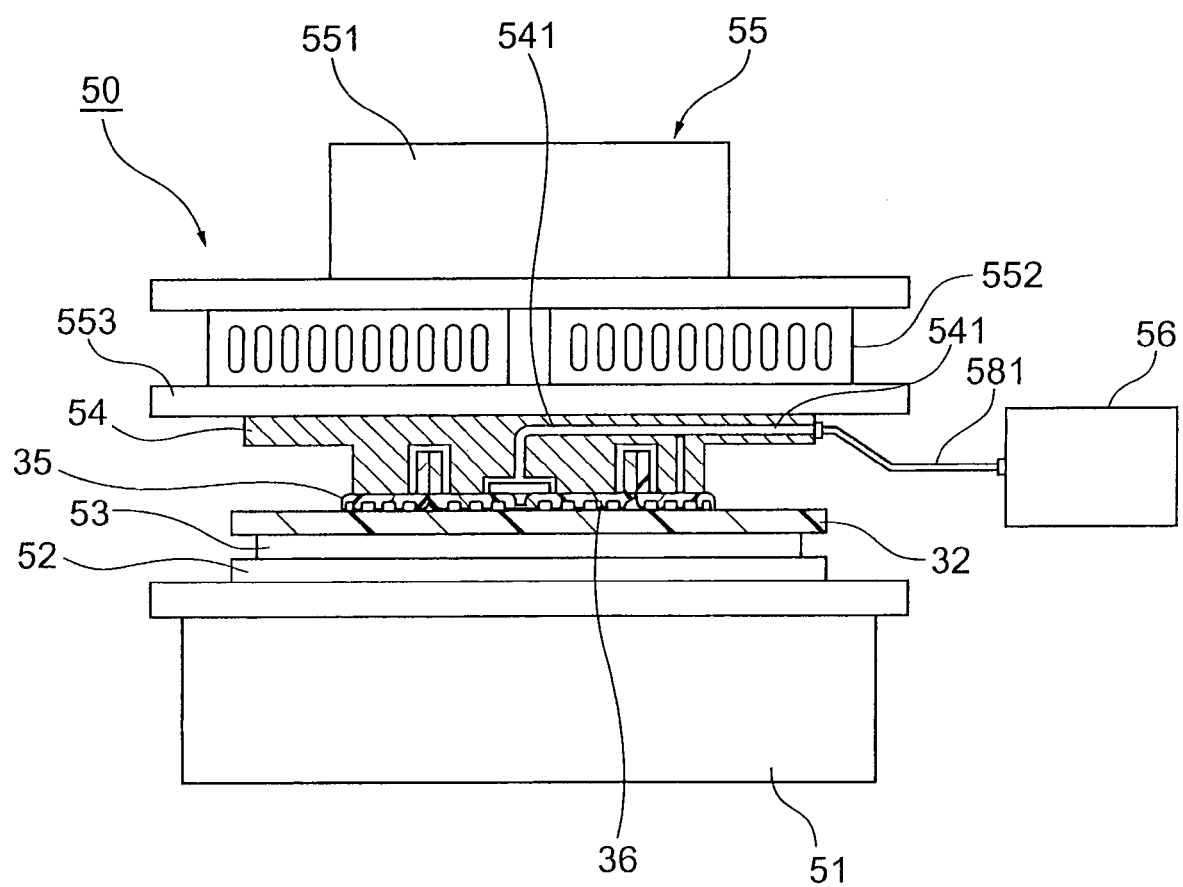
FIG. 8 is a schematic configuration view of a vibration welder for welding the frame and the reinforcement members shown in the first embodiment to the instrument panel.

Next, the configuration of the vibration welder shown in FIG. 8 is explained.

The vibration welder 50 comprises, as shown in FIG. 8, pressurizing means 51, a pressurizing table 52, a pressurizing jig 53, vibration generating means 55, a cooling fluid supply source 56, and so on.

The pressurizing means 51 supports the pressurizing table 52 vertically movably, and supplies a predetermined pressure necessary for welding to the pressurizing table 52 when the vibration welder 50 operates to weld.

To the upper surface of the pressurizing table 52, the pressurizing jig 53 is attached in a replaceable manner. The pressurizing jig 53 holds either the instrument panel 32 or the frame 35 and the reinforcements 36 which are welded to each other, and on the upper surface of this pressurizing jig 53, the instrument panel 32 is set.

The welding jig 54 holds the other one of the instrument panel 32 or the frame 35 and the reinforcements 36 which are welded to each other, and on the lower surface of this welding jig 54, the frame 35 and the reinforcements 36 are set. The welding jig 54 is coupled to the vibration generating means 55 disposed above the pressurizing table 52.

The vibration generating means 55 is to apply welding vibration to the welding jig 54, which comprises, as shown in FIG. 8, a vibration generating part 551, a vibrating body 552 formed by a leaf spring so as to be vibrated horizontally by the vibration generating part 551, and a support plate 553 provided on the lower surface of this vibrating body 552, and to the lower surface of the support plate 553, the welding jig 54 is attached in a replaceable manner.

The cooling fluid supply source 56 is to cool welding portions between the instrument panel 32 and the frame 35 and the reinforcements 36 by supplying a cooling fluid to the welding portions, and a fluid supply hose 561 of this cooling fluid supply source 56 is connected so that the cooling fluid from the cooling fluid supply source 56 can be supplied to the cooling fluid supply ports 354a and 355a of the joint flange 351 and the cooling fluid supply ports 365a of the reinforcements 363 via a passage 541 provided in the welding jig 54.

Next, operations for vibration-welding the instrument panel 32 and the frame 35 and the reinforcements 36 are explained.

Figure 9A:
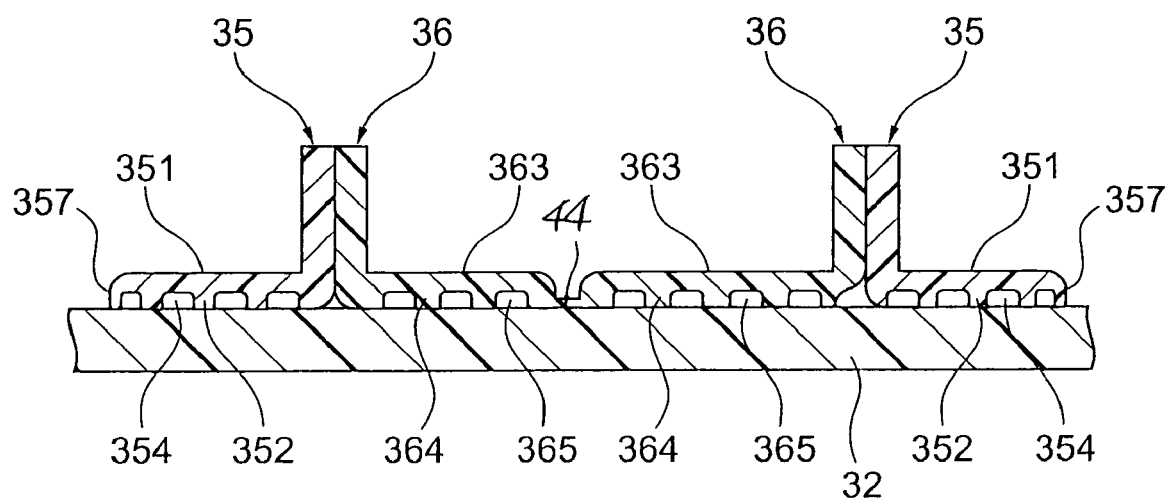
FIG. 9A and FIG. 9B are explanatory sectional views showing a process of welding between the instrument panel and the frame and the reinforcement members in the first embodiment.

First, the instrument panel 32 is set on the pressurizing jig 53, and the frame 35 and the reinforcements 36 are set on the welding jig 54. Then, the pressurizing table 52 is raised by operating the pressurizing means 51 to bring the pressurizing jig 53 near the welding jig 54, and the back surface of the instrument panel 32 and the first weld ribs 352 and 353 of the joint flange 351 and the second weld ribs 364 of the reinforcements 363 which are set, respectively, are made so as to contact each other as shown in FIG. 9A and maintained in a pressurized state by the pressurizing means 51.

Figure 9B:
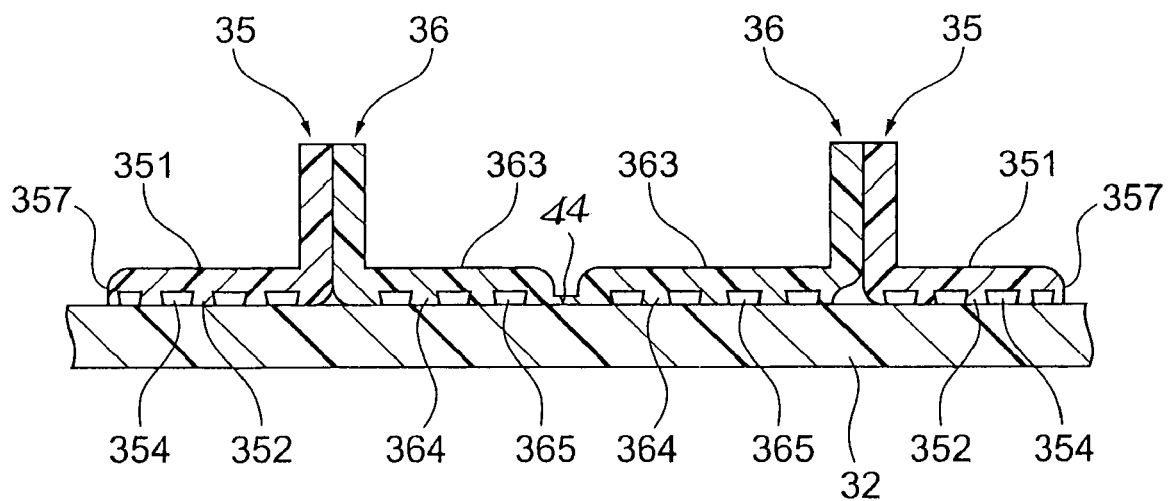

In this state, the vibration generating part 551 of the vibration generating means 55 is started to vibrate the vibrating body 552 horizontally as shown by the arrow A of FIG. 7, whereby the back surface of the instrument panel 32 and the first weld ribs 352 and 353 of the joint flange 351 and the second weld ribs 364 of the reinforcements 363 are rubbed against each other. Then, frictional heat caused thereby melts the pressure-contact surfaces of these members, and these members are welded to each other as shown in FIG. 9B.

Next, after the members are vibration-welded, the vibration generating means 55 is stopped, and simultaneously or a little before stopping the vibration generating means, the cooling fluid supply source 56 is started, and the cooling fluid from the cooling fluid supply source 56 such as the cooled air is flown into the passages 354 and 355 of the joint flange 351 and the passages 365 of the reinforcements 363 via the cooling fluid supply ports 354a and 355a of the joint flange 351 and the cooling fluid supply ports 365a of the reinforcements 363 through the fluid supply hose 561 and the passage 541. This flown-in cooled air is exhausted to the atmosphere from the respective discharge ports 354b, 355b, and 365b while flowing inside the respective passages 354, 355, and 365 along the first weld ribs 352, 353, and 364, thereby cooling the welding portions between the back surface of the instrument panel 32 and the first weld ribs 352 and 353 and the second weld ribs 364 of the reinforcements 363, thus allowing the welding portions to be quickly cooled and preventing other portions other than the welding portions from being over-heated to their melting temperatures.

Details of vibration welding of the first weld rib 352 (or 353 and the second weld rib 364) to the back surface of the instrument panel 32 are explained with reference to FIG. 10A.

Figure 10A:
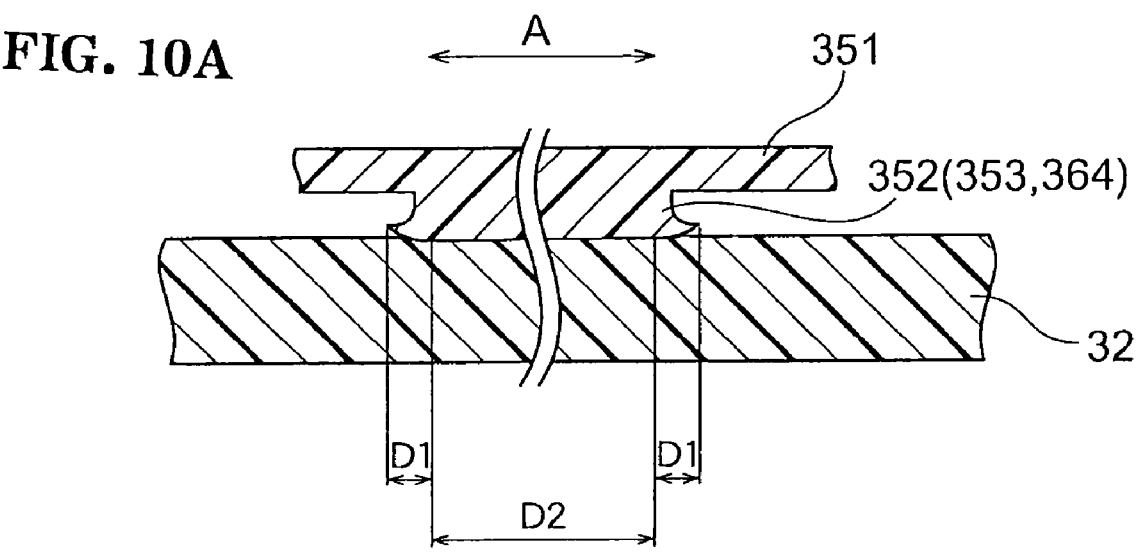
FIG. 10A, FIG. 10B, and FIG. 10C are explanatory sectional views of the respective parts in the first embodiment.

When the first weld rib 352 (or 353 and 364) is vibration-welded to the back surface of the instrument panel 32, on both ends in the vibration direction of the first weld rib 352, as shown in FIG. 10A, a welding start distance D1 necessary for welding the first weld rib 352 to the back surface of the instrument panel 32 is necessary. This welding start distance D1 is 1.5 times as long as the amplitude of the vibration welding, that is D1=1.5 mm to 3.0 mm (amplitude) ×1.5=2.25 mm to 4.5 mm. Therefore, the length of the first weld rib 352 (or 353 and the second weld rib 364) extending in the vibration direction is desirably three times or more as long as the amplitude of the vibration welding, that is, 4.5 mm to 9 mm or more. Particularly, in the case of the first weld rib 353 projectedly provided on the shorter side joining surface 351b of the joint flange 351, the lengths in the vibration direction are set to 4.5 mm to 9 mm or more, whereby sufficient welding strength of the shorter side joining surfaces 351b of the joint flange 351 to the back surface of the instrument panel can be secured, and uniform welding strength is obtained. Even when the welding start distance D1 is secured at both ends in the vibration direction of the first weld rib 352 (or 353 and the second weld rib 364), the portion D2 excluding the welding start distances D1 can be weld penetrated as an effective welding region into the back surface of the instrument panel 32 so as to contribute to the vibration welding to the back surface of the instrument panel.

Figure 10B:
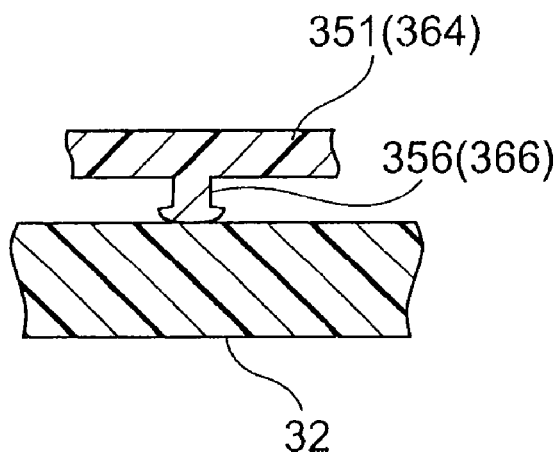

When the first weld rib 352 (or 353 and the second weld rib 364) are vibration-welded to the back surface of the instrument panel 32, the contact of the first passage rib 356 and the second passage rib 366 with the back surface of the instrument panel 32 is as shown in FIG. 10B. Namely, when the tip ends of the first passage rib 356 and the second passage rib 366 are rubbed against the back surface of the instrument panel 32 while pressure-contacted with the back surface, the frictional heat generated thereby melts the tip ends of the first passage ribs 356 and the second passage rib 366, and these deform as shown in FIG. 10B, whereby these are attached airtightly to the back surface of the instrument panel 32. At this time, the widths of the first passage rib 356 and the second passage rib 366 are very small as approximately 1 mm, so that they have almost no welding performance to the back surface of the instrument panel, and do not hinder the vibration welding of the first weld rib 352 (or 353 and the second weld rib 364) to the back surface of the instrument panel.

Figure 10C:
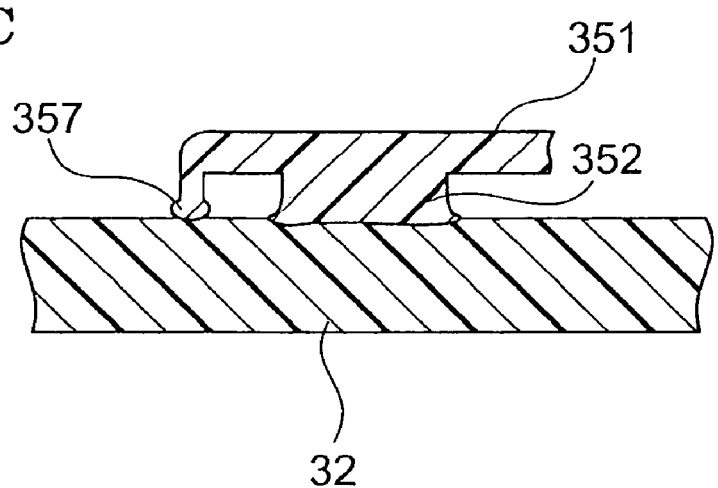

When the first weld rib 352 (or 353 and the second weld rib 364) is vibration-welded to the back surface of the instrument panel 32, the tip end of the rib 357 provided on the outer circumferential edge of the joint flange 351 is melted and deformed by the frictional heat and attached as shown in FIG. 10C. At this time, the width of the rib 357 is very small as approximately 1 mm, so that it has almost no welding performance to the back surface of the instrument panel, and does not hinder the vibration welding of the first weld rib 352 (or 353 and the second weld rib 364) to the back surface of the instrument panel.

According to the airbag apparatus 30 for an automobile shown in the first embodiment, the first weld ribs 352 and 353 projectedly provided on the joining surfaces 351a and 351b of the joint flange 351 of the frame 35 are extended long in the vibration direction of the vibration welding, the second weld ribs 364 projectedly provided on the joining surfaces 363a of the reinforcements 363 of the reinforcement members 36 are extended long in the vibration direction of the vibration welding, and in particular, these lengths of the first weld ribs 352 and 353 and second weld ribs 364 extending in the vibration direction are set to be three times or more as long as the amplitude of the vibration welding, so that sufficient effective welding lengths of the first weld ribs 352 and 353 and the second weld ribs 364 to the back surface of the instrument panel 32 can be secured, the frame 35 and the reinforcement members 36 can be vibration-welded to the instrument panel 32 with uniform strength across the entire joining surfaces, and the welding portions can be prevented from partially separating.

According to the first embodiment, because the first weld ribs 352 and 353 and the second weld ribs 364 are longer in the vibration direction, heat generated by vibrating friction with the back surface of the instrument panel 32 is diffused, so that the first weld ribs 352 and 353 and the second weld ribs 364 are prevented from being locally over-heated, whereby preventing thermal deformation and discoloration of the product.

According to the first embodiment, on the joining surfaces 351a and 351b of the joint flange 351 of the frame 35, passages 354 and 355 for flowing a cooling fluid along the first weld ribs 352 and 353 are provided, and vibration-welding portions of the first weld ribs 352 and 353 are cooled by flowing a cooling fluid into the passages 354 and 355 through the cooling fluid supply ports 354a and 355a and discharge ports 354b and 355b, and furthermore, passages 365 for flowing the cooling fluid along the second weld ribs 364 are provided on the joining surfaces 363a of the reinforcements 363 of the reinforcement members 36, and the vibration-welding portions of the second weld ribs 364 are cooled by flowing the cooling fluid into the passages 365 through the cooling fluid supply ports 365a and discharge ports 365b, whereby reliably preventing thermal deformation and discoloration of the product.

According to the first embodiment, the first passage ribs 356 forming the cooling fluid passages 354 and 355 of the joint flange 351 are formed so as to have a width of 0.3 to 1.5 mm, and the second passage ribs 366 forming the cooling fluid passages 365 of the reinforcements 363 are formed so as to have a width of 0.3 to 1.5 mm, so that these passage ribs 356 and 366 do not adversely influence the vibration welding of the first weld ribs 352 and 353 and the second weld ribs 364, and the cooling fluid passages 354, 355, and 365 can be reliably formed.

According to the first embodiment, the first weld ribs 352 to be formed at the points corresponding to the corners of the joining surfaces 351a and 351b of the joint flange 351 are formed by protrusions 352a with curvatures corresponding to the corner shapes or protrusions 352b inclined at an angle equal to or less than 45 degrees from the vibration direction, so that the corners of the joint flange 351 is reliably vibration-welded to the back surface of the instrument panel 32, and sufficient welding strength is secured.

According to the first embodiment, a rib 357 is formed on the outer circumferential edge of the joint flange 351, thereby preventing melted resin material of the first weld ribs 352, 353 and the back surface of the instrument panel 32 from melting out when the first weld ribs 352, 353 and the back surface of the instrument panel 32 are vibration-welded to each other.

The shapes of the frame 35 and the joint flange 351 of the invention are not limited to the rectangular shapes shown in the first embodiment, and the shapes can be circular or oval.

Second Embodiment

Figure 11:
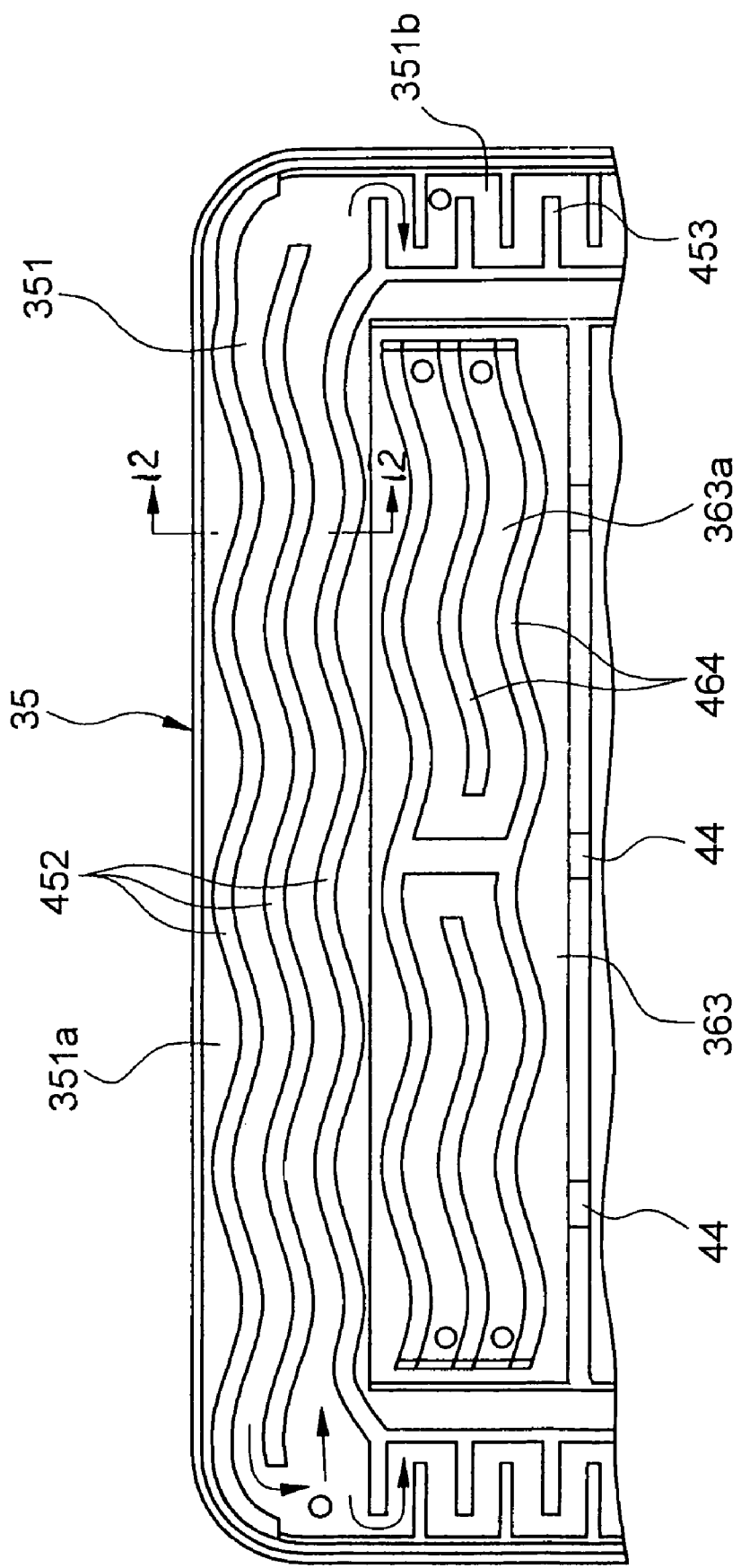
FIG. 11 is a plan view of a main portion of an airbag apparatus for an automobile according to a second embodiment of the invention.
Figure 12:
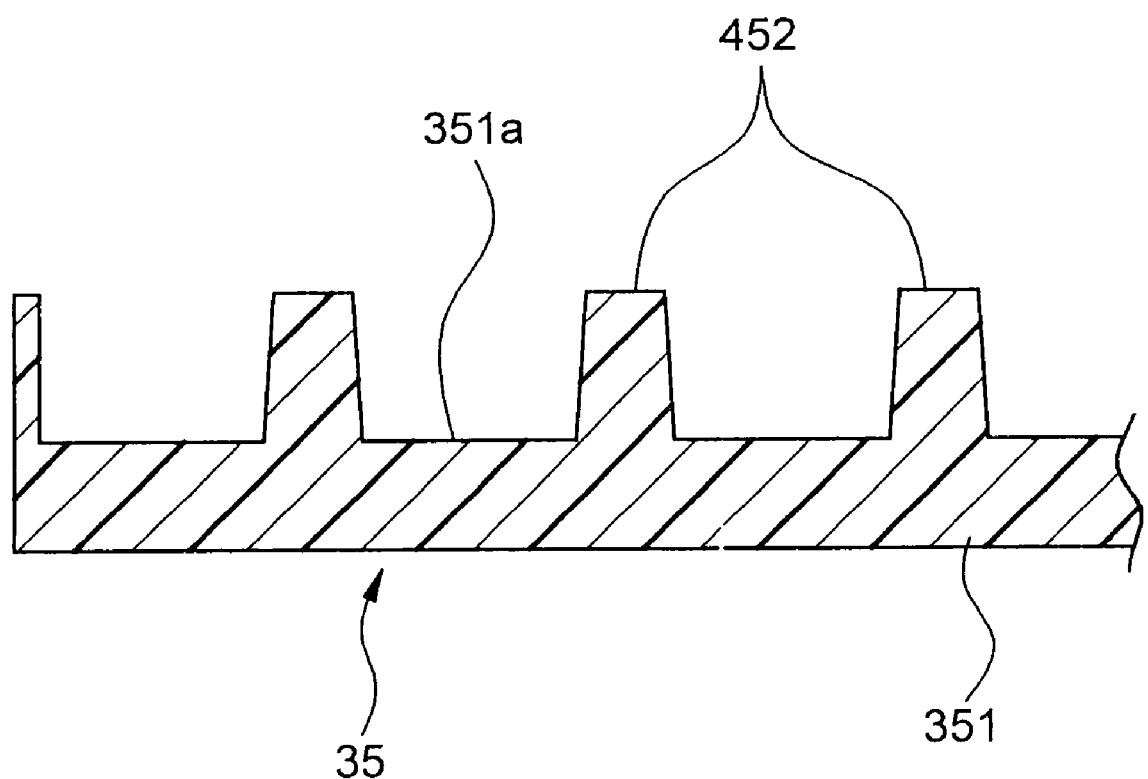
FIG. 12 is a sectional view taken along the line 12-12 of FIG. 11.

FIG. 11 is a plan view of a main portion showing a second embodiment of the airbag apparatus for an automobile of the invention, and FIG. 12 is a sectional view taken along the line 12-12 of FIG. 11.

The configuration of the second embodiment is almost the same as that of the first embodiment described above, and is different from the first embodiment in that the first weld ribs 452 and 453 that are formed on the joining surfaces 351a and 351b of the joint flange 351 and are to be vibration-welded to the back surface of the instrument panel 32 and the second weld ribs 464 formed on the joining surfaces 363a of the reinforcements 463 are formed into shapes curved in a wavelike forms in the longitudinal direction.

The wavelike forms can be well-regulated or irregular.

Other configuration other than this is similar to that of the first embodiment described above, so that the same reference numerals are referred to and description thereof is omitted, accordingly.

According to the second embodiment with the configuration described above, in the welding coupling of the frame 35 and the reinforcements 36 to the instrument panel 32, they become resistant against lateral impacts from all directions after they are welded. When the outer surface of the instrument panel 32 is matte-finished or geometrically-patterned, welding scars do not appear on the surface after welding, so that the external appearance design is improved.

Third Embodiment

Figure 13:
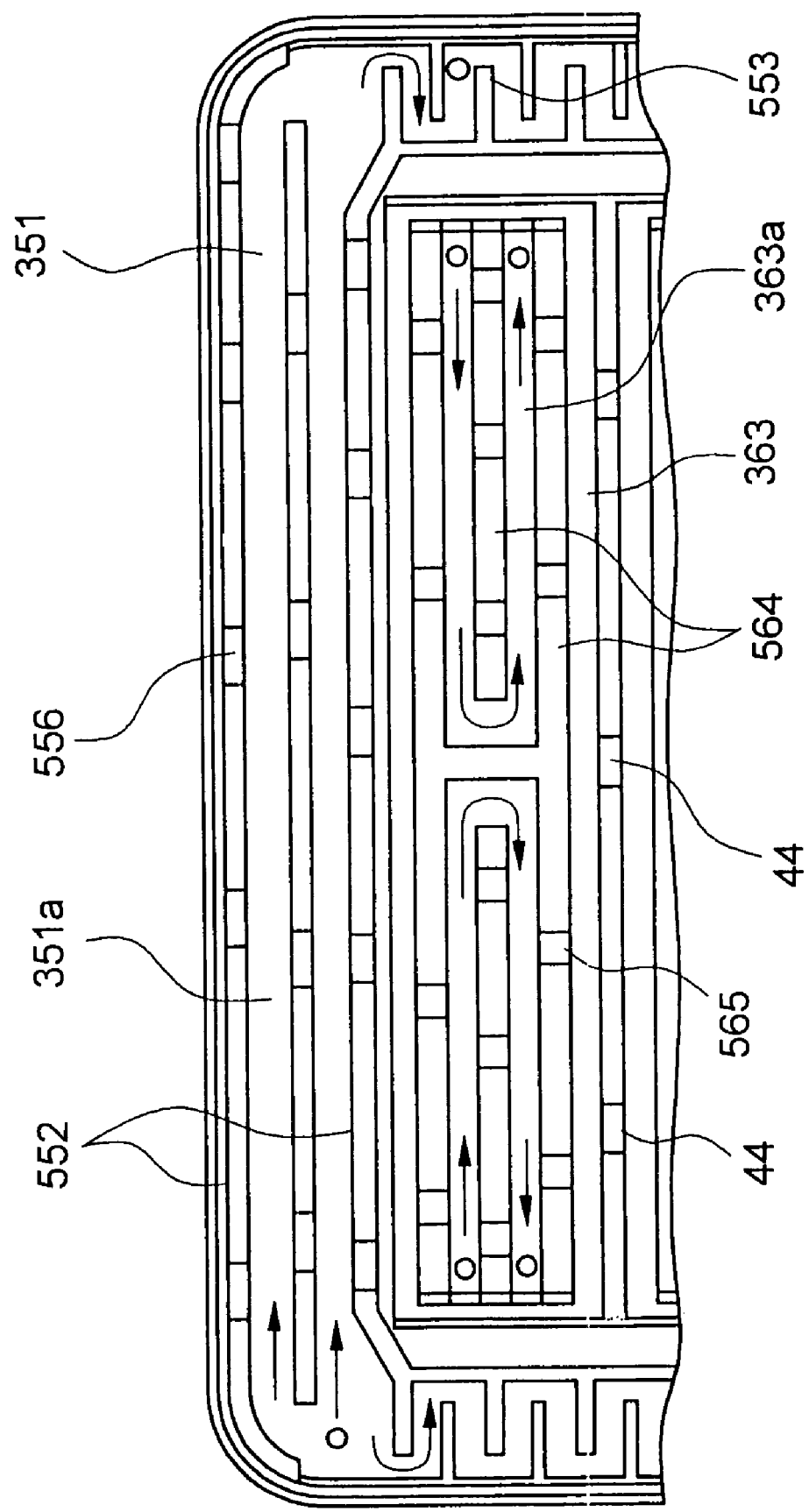
FIG. 13 is a plan view of a main portion of an airbag apparatus for an automobile according to a third embodiment of the invention.

FIG. 13 is a plan view of a main portion showing a third embodiment of the airbag apparatus for an automobile of the invention.

The configuration of the third embodiment is almost the same as that of the first embodiment, and is different from the first embodiment in that the first weld ribs 552 and 553 that are formed on the joining surfaces 351a and 351b of the joint flange 351 and are to be vibration-welded to the back surface of the instrument panel 32, and the second weld ribs 564 formed on the joining surfaces 363a of the reinforcements 363 are formed into shapes having discontinuous portions 556 and 565 due to cutting at predetermined intervals in the longitudinal direction.

It is a matter of course that the discontinuous shapes can be well-regulated or irregular. The discontinuous portions can be formed in the linear first weld ribs 552 and 553 and second weld ribs 564, or in the wavelike first weld ribs 552 and 553 and second weld ribs 564 of the second embodiment.

Other configuration other than this is the same as that of the first embodiment described above, so that the same reference numerals are referred to and description thereof is omitted, accordingly.

According to the third embodiment with the configuration described above, in the welding coupling of the frame 35 and the reinforcements 36 to the instrument panel 32, welding scars are less likely appear on the surface of the instrument panel after welding, so that the external appearance design can be improved.

The invention is not limited to the above-described embodiments, and in a scope without deviating from the gist of the invention, the invention can also be carried out by other various embodiments in its detailed configuration, functions, and action and effects.

What is claimed is:

1. An airbag apparatus for attachment to a vehicle instrument panel comprising:
   an airbag;
   an airbag case in which the airbag is accommodated in a folded state;
   a frame of resin material supporting said airbag case, said frame having a surface adapted to be attached to a back surface of a vehicle instrument panel surrounding a split opening section of the instrument panel, said frame having a joint flange adapted to be attached to the back surface of the instrument panel, said joint flange having a number of first weld ribs with a predetermined width to be vibration-welded to the back surface of the instrument panel, said first weld ribs having a length extending in the vibration direction of the vibration welding and said first weld ribs being spaced at predetermined intervals in a direction perpendicular to the direction of vibration welding, first passages for flowing a cooling fluid along said first weld ribs and cooling fluid supply and discharge ports for supplying and discharging fluid from said first passages; and reinforcement members affixed to the frame to reinforce said split opening section of said instrument panel, said reinforcement members having a number of second weld ribs having a length extending in the vibration direction of the vibration welding and said second weld ribs being spaced at predetermined intervals in a direction perpendicular to the direction of vibration welding.

2. The airbag apparatus of claim 1, wherein the lengths of the first weld ribs and the second weld ribs extending in the vibration direction are three times or more as long as an amplitude of the vibration welding.

3. The airbag apparatus of claim 1, wherein second passages for flowing a cooling fluid along the second weld ribs vibration-welded to the back surface of the instrument panel are provided on the joining surfaces of the reinforcements, and in the second passages, a plurality of cooling fluid supply and discharge ports are provided.

4. The airbag apparatus of claim 3, further comprising first cooling passage ribs having a width of 0.3 to 1.5 mm formed on the joining surfaces of the joint flange, and second cooling passage ribs having a width of 0.3 to 1.5 mm formed on the joining surfaces of the reinforcements.

5. The airbag apparatus of claim 1, wherein the joint flange has a rectangular shape corresponding to the shape of the frame, and said first weld ribs having curvature at corners of the joint flange corresponding to the corner shapes or being inclined at corners of the joint flange at an angle less than 90 degrees from the vibration direction.

6. The airbag apparatus of claim 1, wherein a rib is formed on the outer edge of the joint flange.

7. The airbag apparatus of claim 1, wherein at least either one of the first weld ribs or the second weld ribs extend continuously in linear or wavelike forms in the vibration direction.

8. The airbag apparatus of claim 1, wherein at least either one of the first weld ribs or the second weld ribs extend so as to be arranged in linear or wavelike forms at predetermined intervals in the vibration direction.

* * * * *